United States Patent Office 3,453,366
Patented July 1, 1969

---

3,453,366
THERAPEUTIC COMPOSITIONS CONTAINING 3-[4-(4 - FLUORO-PHENYL) - PIPERAZINOMETHYL]-INDOLE
Roland-Yves Mauvernay and Norbert Busch, both of Route de Marsat, 63 Riom, France
No Drawing. Filed Apr. 10, 1967, Ser. No. 629,390
Claims priority, application Monaco, Apr. 21, 1966, 617
Int. Cl. A61k 27/00; C07d 57/00
U.S. Cl. 424—250   4 Claims

ABSTRACT OF THE DISCLOSURE

A pharmaceutical composition comprising a therapeutically effective amount of 3-[4-(4-fluoro-phenyl)-piperazinomethyl]-indole and an inert, physiologically acceptable carrier.

---

The present invention relates to a novel indole derivative, a process for the preparation thereof and compositions comprising said derivative.

It has now been found that the compound 3-[4-(4-fluoro-phenyl)-piperazinomethyl]-indole having the formula:

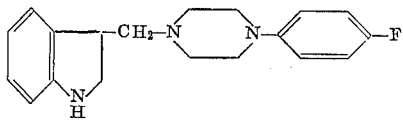

has valuable analgesic and anti-inflammatory activity. This compound forms white crystals, has a melting point of 164° C., is insoluble in water and is soluble in the usual organic solvents; it is a novel compound.

According to the present invention, there is therefore provided 3-[4-(4-fluoro - phenyl) - piperazinomethyl]-indole, as a new compound, and also pharmaceutical compositions comprising therapeutically effective amounts of this compound and an inert, physiologically acceptable carrier.

This compound can be prepared by reacting 4-(4-fluoro)-phenyl-piperazine with formaldehyde and then reacting the formed intermediate product with indole.

The preparation of the new compound is illustrated in the following example:

EXAMPLE 15 g. of glacial acetic acid were added to 36 g. (0.2 mol) of 4-(4-fluoro)-phenyl-piperazine and, after cooling, 20 g. of a 30% aqueous solution of formaldehyde were added. 50 ml. of absolute alcohol were then added while agitating the mixture.

23.4 g. (0.2 mol) of indole were added in a single portion; an exothermic reaction took place and the resulting clear solution was allowed to stand for 4 hours at room temperature. The solution was then poured slowly and with agitation into 300 ml. of a 5% aqueous ammonia solution. A white precipitate was obtained which was filtered, washed with water and then dried in air.

After two recrystallizations from ethanol, 44 g. of a white crystalline powder having a M.P. of 164° C. and molecular weight of 309.36, were obtained.

Physico-chemical characteristics:

White crystalline powder, insoluble in water, soluble in the usual organic solvents.

| | Percent |
|---|---|
| C | 73.76 |
| H | 6.50 |
| N | 13.58 |

The pharmacodynamic examination of this compound has shown that its acute toxicity in mice on oral administration is greater than 3000 mg./kg.

The analgesic action has been studied using two pain stimuli, that is thermal and chemical stimuli—heating plate: (method of N. B. Eddy and D. Leimbach) J. Parmacol. Exp. Ther., 107, 385 (1953); acetic acid: (method of Koster modified by Witkin) R. Koster, M. Anderson and E. J. De Beer, Fed. Proc., 18, 412, (1959); L. B. Witkin, C. F. Heubner, F. Galdi, E. O'Keefe, P. Spitaletta and A. J. Plummer, J. Pharmacol. Exp. Ther., 133, 400–408 (1961).

Using the compound according to the invention, the ED50 for the heating plate is 90 mg./kg. and for acetic acid is 35 mg./kg. Under the same conditions, and for comparison purposes, the ED50 of Pyramidon for the heating plate is 200 mg./kg. and for acetic acid is 250 mg./kg.

The anti-inflammatory action has been studied using the kaolin oedema test on rats (Wilhelmi and Domenjoz, Arzneimittel Forschung, 1, 151 (1951)).

At 125 mg./kg. using the compound according to the invention, the maximum value for inhibition of oedema is 60%; the planimetric value is 328. Under the same conditions using Pyramidon for comparison purposes at 125 mg./kg. the inhibition of oedema is 26% and the planimetric value is 146 and at 250 mg./kg. the inhibition of oedema is 51% and the planimetric value is 295.

In human therapy the compound according to the invention is preferably used in the form of compressed tablets containing 50 mg. of the compound and conventional excipients or in the form of suppositories containing 100 mg. of the compound and cocoa butter or semi-synthetic glycerides, as the excipient. Such tablets are suitably administered at a rate of from 1 to 4 per day and the suppositories at a rate of 1 or 2 per day.

What we claim is:

1. A pharmaceutical composition comprising a therapeutically effective amount of 3-[4-(4-fluoro-phenyl)-piperazinomethyl]-indole and an inert, physiologically acceptable carrier.

2. A composition according to claim 1 in the form of a tablet containing 50 mg. of 3-[4-(4-fluoro-phenyl)-piperazinomethyl]-indole.

3. A composition according to claim 1 in the form of a suppository containing 100 mg. of 3-[4-(4-fluoro-phenyl)-piperazinomethyl]-indole.

4. A composition according to claim 3 wherein the inert physiologically acceptable carrier is cocoa butter or a semi-synthetic glyceride.

References Cited

UNITED STATES PATENTS 3,328,407   6/1967   Archer.

OTHER REFERENCES

J. Med. Pharm. Chem., 5, pp. 932–943 (1962).

ALBERT T. MEYERS, Primary Examiner.

STANLEY J. FRIEDMAN, Assistant Examiner.

U.S. Cl. X.R.

260—268